US010496467B1

(12) United States Patent
Aiken et al.

(10) Patent No.: US 10,496,467 B1
(45) Date of Patent: Dec. 3, 2019

(54) MONITORING SOFTWARE COMPUTATIONS OF ARBITRARY LENGTH AND DURATION

(71) Applicant: Amazon Technologies, Inc., Seattle, WA (US)

(72) Inventors: Mark Aran Aiken, Seattle, WA (US); Raghunathan Kothandaraman, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 382 days.

(21) Appl. No.: 15/408,787

(22) Filed: Jan. 18, 2017

(51) Int. Cl.
 *G06F 11/07* (2006.01)
 *G06F 9/54* (2006.01)
 *G06F 11/14* (2006.01)

(52) U.S. Cl.
 CPC ........... *G06F 11/079* (2013.01); *G06F 9/546* (2013.01); *G06F 11/0706* (2013.01); *G06F 11/0757* (2013.01); *G06F 11/0793* (2013.01); *G06F 11/1469* (2013.01); *G06F 11/1471* (2013.01)

(58) Field of Classification Search
 CPC ............... G06F 11/141; G06F 11/1469; G06F 11/1471; G06F 9/546; G06F 9/45558
 See application file for complete search history.

(56) References Cited

U.S. PATENT DOCUMENTS

| 5,721,825 | A | 2/1998 | Lawson et al. |
| 5,751,914 | A | 5/1998 | Coley et al. |
| 6,185,613 | B1 | 2/2001 | Lawson et al. |
| 6,477,585 | B1 | 11/2002 | Cohen et al. |
| 7,275,250 | B1 | 9/2007 | Novik et al. |
| 7,451,145 | B1 | 11/2008 | Boxmeyer |
| 7,523,137 | B2 | 4/2009 | Kass et al. |
| 8,805,861 | B2 | 8/2014 | Boyan et al. |
| 8,898,218 | B2 | 11/2014 | Thompson |
| 9,210,056 | B1 | 12/2015 | Choudhary et al. |
| 9,294,361 | B1 | 3/2016 | Choudhary et al. |
| 9,305,238 | B2 | 4/2016 | Srinivasan et al. |
| 9,531,755 | B2 | 12/2016 | Singla et al. |
| 9,674,124 | B1 | 6/2017 | Fisher et al. |
| 10,063,579 | B1 | 8/2018 | Machani |
| 2002/0010804 | A1 | 1/2002 | Sanghvi et al. |

(Continued)

OTHER PUBLICATIONS

U.S. Appl. No. 15/262,752, filed Sep. 12, 2016, Non-Final Office Action dated Mar. 27, 2018.

(Continued)

*Primary Examiner* — Jigar P Patel
(74) *Attorney, Agent, or Firm* — Thomas | Horstemeyer, LLP

(57) ABSTRACT

Disclosed are various embodiments for monitoring software computations of potentially arbitrary length and duration for event processing and related systems. A pattern of events describing user interaction with a client application or a network site may be received, where a virtual process is generated to match events received from various computing resources to the pattern. A self-healing watchdog process may be generated that, after a period of time, periodically checks a state of the virtual process relative to matching the pattern of events. Any detected anomalies may be stored in a delay queue and returned to the watchdog process after a period of time.

20 Claims, 11 Drawing Sheets

(56) References Cited

U.S. PATENT DOCUMENTS

| | | |
|---|---|---|
| 2002/0019886 A1 | 2/2002 | Sanghvi et al. |
| 2002/0019945 A1 | 2/2002 | Houston et al. |
| 2002/0143857 A1 | 10/2002 | Bidarahalli et al. |
| 2003/0101287 A1 | 5/2003 | Novik et al. |
| 2003/0144849 A1 | 7/2003 | Kakivaya et al. |
| 2003/0158700 A1* | 8/2003 | Forler ............... G06F 11/0757 702/178 |
| 2003/0172167 A1 | 9/2003 | Judge et al. |
| 2003/0172292 A1 | 9/2003 | Judge |
| 2004/0153844 A1 | 8/2004 | Ghose et al. |
| 2005/0114487 A1 | 5/2005 | Peng et al. |
| 2005/0172162 A1 | 8/2005 | Takahashi et al. |
| 2005/0273593 A1 | 12/2005 | Seminaro et al. |
| 2006/0230071 A1 | 10/2006 | Kass et al. |
| 2006/0265406 A1 | 11/2006 | Chkodrov et al. |
| 2007/0005740 A1 | 1/2007 | Difalco et al. |
| 2007/0011292 A1 | 1/2007 | Fritsch et al. |
| 2008/0016502 A1 | 1/2008 | Henderson et al. |
| 2008/0059491 A1 | 3/2008 | Gatti |
| 2008/0086363 A1 | 4/2008 | Kass et al. |
| 2008/0114873 A1 | 5/2008 | Chakravarty et al. |
| 2008/0148398 A1 | 6/2008 | Mezack et al. |
| 2008/0294771 A1 | 11/2008 | Hermes et al. |
| 2009/0063206 A1 | 3/2009 | Payne et al. |
| 2009/0106701 A1 | 4/2009 | Yalamanchi |
| 2009/0256288 A1 | 10/2009 | Chakravarty et al. |
| 2009/0265288 A1 | 10/2009 | Chakravarty et al. |
| 2010/0082950 A1 | 4/2010 | Kinzhalin et al. |
| 2011/0010209 A1 | 1/2011 | McNally |
| 2011/0137942 A1 | 6/2011 | Yan et al. |
| 2011/0154092 A1* | 6/2011 | Dash ............... G06F 11/0709 714/2 |
| 2011/0154367 A1 | 6/2011 | Gutjahr et al. |
| 2011/0258638 A1* | 10/2011 | Davies ............... G06F 9/546 719/314 |
| 2011/0304466 A1 | 12/2011 | Bair, III et al. |
| 2012/0005152 A1 | 1/2012 | Westen et al. |
| 2012/0084399 A1 | 4/2012 | Scharber et al. |
| 2012/0089868 A1 | 4/2012 | Meijer et al. |
| 2012/0130843 A1 | 5/2012 | Himmerick et al. |
| 2012/0246200 A1 | 9/2012 | Balasubramanian et al. |
| 2012/0254313 A1 | 10/2012 | Fake et al. |
| 2012/0284105 A1 | 11/2012 | Li |
| 2012/0323941 A1 | 12/2012 | Chkodrov et al. |
| 2012/0324359 A1 | 12/2012 | Lee |
| 2013/0066670 A1 | 3/2013 | Krishnan |
| 2013/0132942 A1* | 5/2013 | Wang ............... G06F 8/61 717/176 |
| 2013/0219361 A1 | 8/2013 | Fiebig et al. |
| 2013/0227596 A1 | 8/2013 | Pettis et al. |
| 2013/0254524 A1 | 9/2013 | Snapir et al. |
| 2014/0149438 A1 | 5/2014 | Baum et al. |
| 2014/0250121 A1 | 9/2014 | Kieselbach et al. |
| 2015/0106927 A1 | 4/2015 | Ferragut et al. |
| 2015/0149565 A1 | 5/2015 | Ahmed |
| 2015/0154249 A1 | 6/2015 | Dave et al. |
| 2015/0207871 A1 | 7/2015 | Li |
| 2015/0269606 A1 | 9/2015 | Hewett et al. |
| 2015/0293955 A1 | 10/2015 | Dickey |
| 2015/0295766 A1 | 10/2015 | Dickey |
| 2015/0295775 A1 | 10/2015 | Dickey |
| 2015/0295780 A1 | 10/2015 | Hsiao et al. |
| 2015/0381712 A1 | 12/2015 | De et al. |
| 2016/0004629 A1* | 1/2016 | Bharara ............... G06F 11/3692 714/38.1 |
| 2016/0004733 A1 | 1/2016 | Cao et al. |
| 2016/0026510 A1 | 1/2016 | Furtwangler et al. |
| 2016/0028688 A1 | 1/2016 | Chizhov et al. |
| 2016/0063080 A1 | 3/2016 | Nano et al. |
| 2016/0070581 A1 | 3/2016 | Soon-Shiong |
| 2016/0103838 A1 | 4/2016 | Sainani et al. |
| 2016/0182561 A1 | 6/2016 | Reynolds, II et al. |
| 2016/0224804 A1 | 8/2016 | Carasso |
| 2016/0241573 A1 | 8/2016 | Mixer |
| 2017/0005886 A1 | 1/2017 | Dade et al. |
| 2017/0006141 A1 | 1/2017 | Bhadra |
| 2017/0011527 A1 | 1/2017 | Matsunaga et al. |
| 2017/0104799 A1 | 4/2017 | Prock et al. |
| 2017/0124569 A1 | 5/2017 | Revelle et al. |
| 2017/0155694 A1 | 6/2017 | Pinkovezky et al. |
| 2017/0272306 A1 | 9/2017 | Venkataraman et al. |
| 2017/0287475 A1 | 10/2017 | Baldwin |
| 2017/0318074 A1 | 11/2017 | Margatan et al. |
| 2017/0345277 A1 | 11/2017 | Kurniawan et al. |
| 2017/0372429 A1 | 12/2017 | La Placa |
| 2018/0004729 A1 | 1/2018 | Qiu et al. |
| 2018/0034840 A1 | 2/2018 | Marquardt et al. |
| 2018/0367623 A1 | 12/2018 | Fisher et al. |

OTHER PUBLICATIONS

U.S. Appl. No. 15/262,744, filed Sep. 12, 2016, Non-Final Office Action dated Jul. 31, 2018.

U.S. Appl. No. 15/262,752, filed Sep. 12, 2016, Notice of Allowance dated Sep. 20, 2018.

U.S. Appl. No. 15/262,744, filed Sep. 12, 2016, Notice of Allowance dated Feb. 5, 2019.

Eugster et al., "Event Systems—How to Have Your Cake and Eat it Too", in Proceedings of the 22nd International Conference on Distributed Computing Systems Workshops (ICDCSW '02), IEEE Computer Society, 2002, 6 pages. (Year: 2002).

Li et al., "PIE: Approximate Interleaving Event Matching over Sequences", 2015 IEEE 31st International Conference on Data Engineering, Apr. 13-17, 2015, Seoul, South Korea, pp. 747-758. (Year 2015).

Robins D. B., "Complex Event Processing", CSEP 504, University of Washington, Redmond, WA, Feb. 6, 2010, 10 pages. (Year 2010).

* cited by examiner

```
160b
{
    "anomaly": {                                                    303b                                       306b
        "anomaly_identifier": "A9578ZEF2",
        "anomaly_type": "monitoring entity generating incorrect results",
        "compute_engine_identifer": "CE15623",
        "timestamp": "2016-12-12 12:00PM EST",
        "return_duration": "900sec",              309b
        "watchdog_identifier": "WD15623",  315b  312b
        "severity_level": "HIGH",
        "misc_information": {              318b
            ...                     321b
        }
    }
}
```

MONITORING SOFTWARE COMPUTATIONS OF ARBITRARY LENGTH AND DURATION

BACKGROUND

Large-scale data processing systems such as web services and the like can produce vast amounts of log data including data associated with various end users, such as visitors of a network site and users of a mobile application. From time to time, it may be desirable to review such data to identify events of interest. For example, a marketing team may desire to track behavioral purchase patterns of individual users. In another example, a site development team may desire to identify site navigation patterns for individual users. However, the quantity of log data generated by such systems may present significant difficulties in terms of data storage and review. Querying data stores having millions to billions of entries, for example, may consume bandwidth, monopolize computing resources, and provide slow search results.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
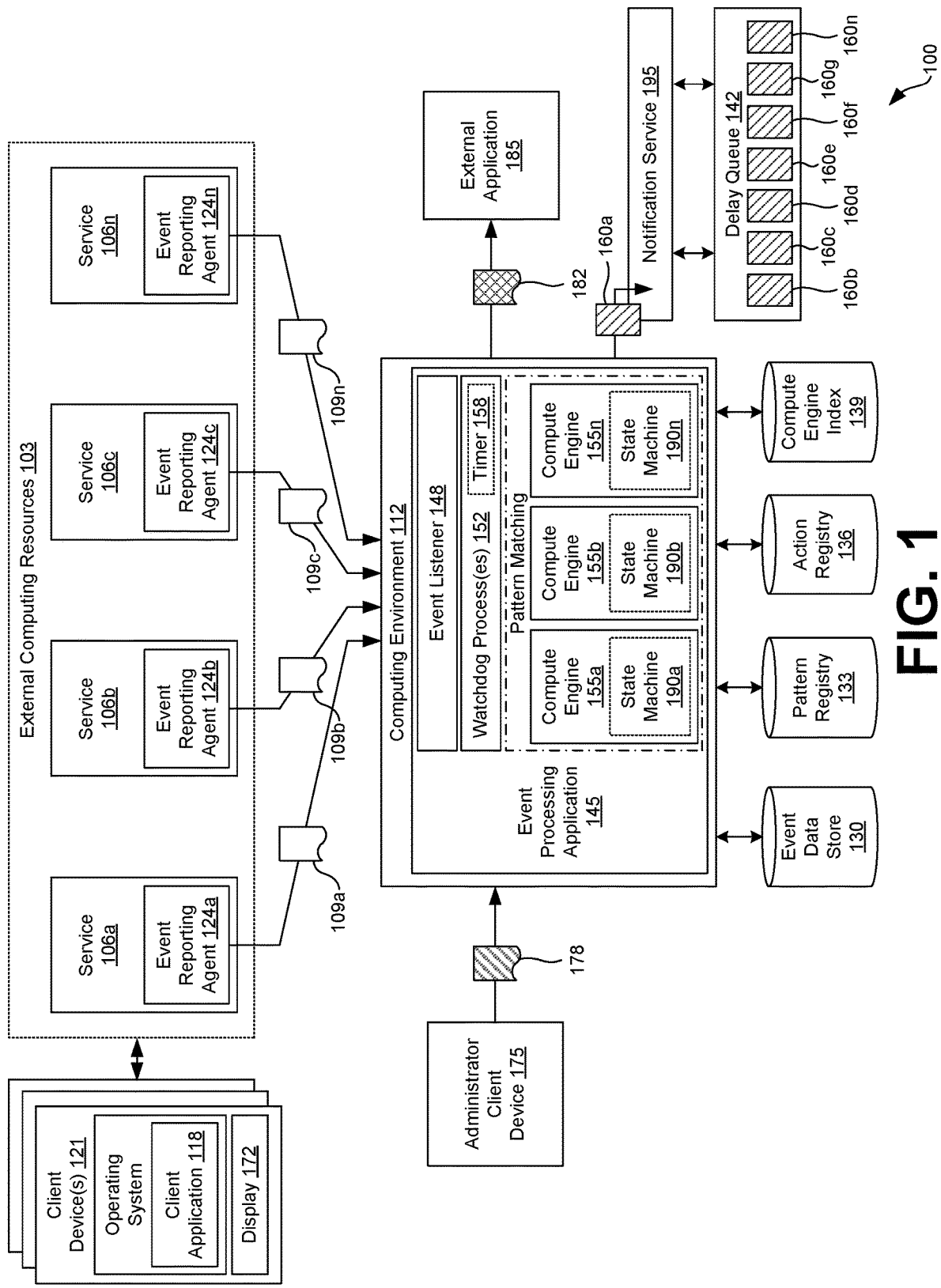
FIG. 1 is a drawing of an event monitoring system implemented as a networked environment according to various embodiments of the present disclosure.

The present disclosure relates to monitoring software computations of potentially arbitrary length and duration for event processing and related systems. It may be desirable to monitor user interactions with computer applications and network sites, for example, to improve customer experience, market potential goods and services to customers, drive engagement, or monitor user behavior. However, events performed by users in those computer applications, if recorded, can amass quickly in a data store, potentially totaling millions to billions of entries. The quantity of data may present significant difficulties in terms of review. For example, a marketing team may desire to analyze customer behavior with a company's software application to determine how to better market a product to a person based on their behavior while a software development team may determine whether a user is interacting with various components of a user interface. However, running queries on data stores having millions to billions of entries of user interactions may be problematic due to limitations in database processing, bandwidth, and other computing resources. Additionally, providing search results in a timely fashion may be difficult.

An event monitoring system may be employed to monitor user-generated events in real-time to identify and match behavioral patterns as they occur. Events may include interactions performed by a user in association with a particular application, such as a web browser (as well as a network site accessed through the web browser), a media player, a reading application, a shopping application, or other similar type of application. To this end, events may include, for example, a record of an interaction with a user interface component, an access of a product page for a particular item in a shopping application, a purchase of an item, a playback of a movie or song in a media player, a completion of a virtual novel in a book reading application, or other similar action.

As may be appreciated, different personnel may desire data pertaining to different types of events. For example, a marketing team may desire to identify purchase events while a media team may desire to identify media consumed by users. A computing environment may be employed to allow administrators to specify behavioral patterns to track and monitor in real-time, as opposed to the administrators having to manually query event data after it has been collected. In some embodiments, administrators may specify one or more actions that may be performed when events performed by a user match or satisfy all events in a given pattern. For example, a pattern of events may include a collection of events referred to as a "milestone," where a particular user is rewarded for completing all events in the milestone.

However, when an administrator specifies a pattern of events for the computing environment to monitor in real-time, the pattern of events can have an arbitrary length and duration. For instance, a number of events in a pattern is arbitrary as an administrator can specify a number of different types of events to monitor. Additionally, some patterns of events specified by administrators may not have a finite duration. Any resources dedicated to matching those events may never be terminated, thereby wasting valuable computing resources and providing no benefit. Accordingly, to improve operation of hardware and software components of an event monitoring system, any resources dedicated to matching patterns of events should be monitored.

According to various embodiments described herein, a computing environment may be configured to generate a virtual process, such as a compute engine, where the virtual process is configured to match a pattern of events created by an administrator against events received from various computing resources. Upon creation of the pattern of events (or the virtual process generated to match the pattern of events), a watchdog process may be generated that is configured to identify irregularities with any resources dedicated to matching a pattern of events. In one embodiment, the watchdog process may analyze a state of the virtual process to identify anomalies, where anomalies include any irregularities identified in the matching of a pattern. For instance, a state of the virtual process can be checked to determine whether the virtual process is still operational. In some embodiments, anomalies may include a virtual process having terminated prematurely or expired, a virtual process or its subcomponents not being operational, a virtual process generating incorrect results, or other irregularity.

When an anomaly is detected, instead of creating a ticket for an information technology (IT) personnel to review, the watchdog process may be configured to "self-heal" by attempting to review detected anomalies on a periodic basis and perform remedial actions, if available. In one embodiment, when an anomaly is detected, the anomaly is added to a delay queue. After a period of time, the watchdog process can access the anomaly from the delay queue and determine whether the anomaly persists. If the anomaly is no longer detected, the anomaly may be removed from the delay queue.

In the following discussion, a general description of a self-healing watchdog process for monitoring software computations of potentially arbitrary length and duration and its components is provided, followed by a discussion of the operation of the same.

With reference to FIG. 1, shown is an event monitoring system 100 according to various embodiments of the present disclosure. The event monitoring system 100 includes external computing resources 103 that include a number of services 106a . . . 106n (collectively "services 106"), as will be described. Generally, the services 106 report events 109a . . . 109n (collectively "events 109") to a computing environment 112 for analysis. Events 109 may describe interactions with a client application 118 executable on a client device 121, as will also be described.

In one embodiment, each of the services 106 are executed on one or more servers or other hardware with like capability to serve up network data to the client device 121, as well as observe interactions with the client application 118. For example, the services 106 may serve up network pages to the client devices 121 or data used to generate user interfaces in a dedicated application. As the services 106 serve up the network data to the client devices 121, the services 106 may be configured to observe when a user manipulates a hyperlink, a button in a user interface, or performs another type of action, such as purchasing an item in an electronic commerce system, playing a movie, and so forth. As interactions are observed, the services 106 may be configured to communicate an event 109 to the computing environment 112 describing an interaction with a client application 118 as soon as it is identified, or shortly thereafter.

The services 106 may communicate events 109 to the computing environment 112 over a network that may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The tasks performed by each respective service 106, such as serving up content to client applications 118, may be independent of the tasks performed by other ones of the services 106. In this respect, each service 106 may be disconnected or independent of the other services 106. Stated another way, no one service 106 knows about the operations or tasks performed by any of the other services 106. Thus, the services 106 may operate independently of each other.

The services 106 may include event reporting agents 124a . . . 124n (collectively "event reporting agents 124"). Each of the event reporting agents 124 may include logic that operates in conjunction with a particular client application 118 or function of a client device 121 to measure user interaction. In other words, the event reporting agents 124 generate events 109 describing interactions that are transmitted to a computing environment 112 over a network. In some embodiments, the event reporting agents 124 may be executed on the client device 121, for example, as a component of the client application 118 or as a standalone application.

The computing environment 112 may comprise, for example, a server computer or any other system providing computing capability. Alternatively, the computing environment 112 may employ a plurality of computing devices that may be arranged, for example, in one or more server banks or computer banks or other arrangements. Such computing devices may be located in a single installation or may be distributed among many different geographical locations. For example, the computing environment 112 may include a plurality of computing devices that together comprise a hosted computing resource, a grid computing resource, or any other distributed computing arrangement. In some cases, the computing environment 112 may correspond to an elastic computing resource where the allotted capacity of processing, network, storage, or other computing-related resources may vary over time.

Various applications or other functionality may be executed in the computing environment 112 according to various embodiments. Also, various data is stored in data stores that are accessible to the computing environment 112. The data stores may include, for example, an event data store 130, a pattern registry 133, an action registry 136, a compute engine index 139, a delay queue 142, as well as other data stores as may be appreciated. The data stores may comprise hardware memory, virtual memory, or a combination thereof and may be associated with the operation of the various applications or functional entities described below.

The components executed on the computing environment 112, for example, include an event processing application 145 and other applications, services, processes, systems, engines, or functionality not discussed in detail herein. The event processing application 145 is executed to process events 109 received from the services 106, identify certain patterns of events 109, and perform predetermined actions when patterns of events are matched against received events 109. Processing events 109 may include classifying events 109 and communicating events 109 to appropriate services such that the events 109 may be processed in a computationally efficient manner. To this end, the event processing application 145 may include an event listener 148, an event translator as discussed in co-pending U.S. patent application Ser. No. 15/262,752, entitled "EVENT PROCESSING ARCHITECTURE FOR REAL-TIME USER ENGAGE- MENT," filed on Sep. 2, 2016, and co-pending U.S. patent application Ser. No. 15/262,744, entitled "FILTERS AND EVENT SCHEMA FOR CATEGORIZING AND PROCESSING STREAMING EVENT DATA," filed on Sep. 2, 2016, the contents of which are incorporated by reference in their entirety herein.

The event processing application 145 may include other applications and services not discussed in detail herein. The event processing application 145 may also include watchdog processes 152 configured to monitor resources of the computing environment 112 in association with matching patterns of events, as will be described.

In some embodiments, the event processing application 145 may instantiate virtual processes, such as compute engines 155*a* . . . 155*n* (collectively "compute engines 155") that process events 109 for a given pattern. In some embodiments, a compute engine 155 may be generated to match a pattern of events for a multitude of user accounts. In other embodiments, a compute engine 155 may be generated to match a pattern of events for a single user account. As a compute engine 155 may include a virtual process, in various embodiments, the compute engine 155 includes an instance of a virtual machine, a threaded process, or other virtual process.

The event listener 148 is executed to monitor events 109 received from the services 106, classify events 109, and send events 109 to interested compute engines 155, such as the compute engines 155 that utilize those events 109 in matching a pattern. In some embodiments, the event listener 148 receives a stream of events 109 in a queue, buffer, or like mechanism. An event translation may be performed to translate events 109 from a current format to another that a compute engine 155 is able to interpret.

The watchdog processes 152 may include a virtual process generated to monitor resources of the computing environment 112 dedicated to matching a pattern of events. In one embodiment, the watchdog processes monitor states of the compute engines 155, for example, to determine whether any irregularities exist in the pattern matching. Each of the watchdog processes 152 may include a timer 158 that is set, for example, relative to when the watchdog processes 152 are created or when a particular state of a compute engine 155 changes. Once a timer 158 expires, a watchdog process 152 may evaluate criteria associated with a particular state of the compute engine 155 to potentially identify anomalies 160*a* . . . 160*n* (collectively "anomalies 160"). Anomalies 160 may include any irregularities identified pertaining to resources dedicated to matching a pattern of events. If one or more irregularities are identified, the watchdog process 152 may attempt to take corrective or remedial action.

Functionality of the watchdog processes 152 may vary from conventional watchdog timers employed in computer hardware. For example, conventional watchdog timers include a hardware timer that automatically generates a reset if a program fails to reset the timer, often beneficial when automatically resetting an embedded system that ceases to perform because of a software or hardware issue. In various embodiments described herein, the compute engines 155 may not be aware of the presence of the watchdog processes 152 and, thus, are not required to send reset commands to or otherwise interact with the watchdog processes 152. In other words, the compute engines 155 may include no logic that interacts specifically with the watchdog processes 152. Instead, a timer 158 for a watchdog process 152 may be set during creation of the watchdog process 152 or in response to a change in state of a compute engine 155 monitored by the watchdog process 152.

The client device 121 is representative of a plurality of client devices that may be coupled to a network. The client device 121 may comprise, for example, a processor-based system such as a computer system. Such a computer system may be embodied in the form of a desktop computer, a laptop computer, personal digital assistant, cellular telephone, smartphone, smartwatch, set-top box, music player, voice interface device, web pad, tablet computer system, game console, electronic book reader, or other devices with like capability. The client device 121 may include a display 172. The display 172 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client devices 121 may be configured to execute various applications such as a client application 118 or other applications. The client application 118 may be executed in the client device 121, for example, to access network content served up by the services 106 or other servers, thereby rendering a user interface on the display 172. To this end, the client application 118 may comprise, for example, a web browser, a dedicated application, etc., and the user interface may comprise a network page, an application screen, etc. In some embodiments, the dedicated application includes, for example, email applications, social networking applications, word processors, spreadsheets, media player applications, video game application, or other applications. The client device 121 may be configured to execute applications beyond the client application 118.

Generally, the computing environment 112 is implemented to receive events 109 from the services 106 and to record such events 109 in the event data store 130. While doing so, the computing environment 112 may be configured to generate a timestamp relative to the time that the events 109 were received and may insert the timestamp as an attribute of the events 109 before they are stored in the event data store 130. In addition, the event processing application 145 may perform other operations on the events 109 before they are stored in the event data stores 130.

In some embodiments, the computing environment 112 may defer to other authoritative sources to record events 109 in the event data store 130. For example, the services 106 that generate the events 109 may record events 109 in their own data stores. In such instances, the computing environment 112 may include custom data adapters that can fetch events 109 from these data sources, when required. This may reduce event storage operation at the computing environment 112 to increase computational efficiency, as may be appreciated.

The event processing application 145 may interact with administrator client devices 175 in order to retrieve various ones of the events 109 stored in the event data store 130 or data associated therewith. Additionally, the event processing application 145 may facilitate creation of a pattern of events. A pattern of events (hereinafter "pattern 178") may include an event 109 or collection of events 109 that an administrator may specify to measure user interaction with a client application 118, a network site, a user interface, a peripheral device, or similar component. For instance, if an administrator desires to receive a notification when a particular user or group of users has watched five movies in a media player application, the administrator may specify a pattern 178 that includes, and monitors for, five instances of a user having watched a movie in the media player application. Each time a user watches a movie, an event 109 is communicated to the computing environment 112 which is routed to a compute engine 155 assigned to match the pattern 178 specified by the administrator. The pattern 178 may also specify an order in which the events 109 should be received for events 109 in the pattern 178 to be matched.

The event processing application 145 may further facilitate creation of an action 182 to be performed when all events 109 in a pattern 178 have been completed. Referring back to the example above, an administrator may specify a pattern 178 to identify users who have watched five movies in the month of August. If the administrator desires to reward users who perform events 109 that match a pattern 178, the administrator may specify an action 182 to be performed automatically when the pattern 178 is completed or "fully matched." For example, users who watch five movies in the month of August may automatically be provided with a coupon to rent a new movie. The event processing application 145 may communicate with external applications 185 to cause performance of actions 182 specified by an administrator via an administrator client device 175. External applications 185 may include other servers or like computer systems.

Next, a general discussion of the operation of the various components of the event monitoring system 100 is provided. To begin, assume, for example, that an entity offers various client applications 118 or network sites for access on client devices 121, and desires to observe interactions made by users with those client applications 118 or network sites. The user interactions may be beneficial in improving user interfaces, managing customer experiences, marketing potential goods and services to customers, increasing user engagement, or monitoring other types of user behavior.

As users of the client devices 121 interact with various types of client applications 118 on their respective client devices 121, the services 106 that provide data for those client applications 118 may identify what type of user interactions occur based on the type of data requested, interactions with various user interface component, etc. The services 106 may communicate data pertaining to those interactions as events 109, which can include one or more data structures. Using events 109, the event monitoring system 100 may identify when patterns 178 occur. For instance, one user may interact with a shopping application to electronically purchase items while another user may interact with a book reader application to read a novel or magazine. An administrator may desire to monitor these interactions and identify patterns 178. Additionally, the administrator may desire the event monitoring system 100 to perform an action 182 when a pattern 178 has been identified.

When a pattern 178 has been specified, the event processing application 145 may dynamically generate compute engines 155 required to monitor users to determine when a pattern 178 of user behavior has been performed. In one embodiment, compute engines 155 are generated for each client device 121 having access to a service 106. In another embodiment, a compute engine 155 is generated for each user account associated with a service 106. As may be appreciated, the compute engines 155 may be configured to sleep or hibernate, or otherwise consume as few computing resources as possible until an event 109 has been passed to a compute engine 155 by the event listener 148. For example, the compute engines 155 may transition into appropriate sleep or hibernate modes of operation prior to an event 109 being received.

When a compute engine 155 is generated by the event processing application 145, the compute engine 155 may be registered with the compute engine index 137. Additionally, the compute engine index 137 may retain types of events 109 for which a compute engine 155 has interest. For example, an administrator may desire to reward users who have read three books in a week with a coupon. The administrator creates a pattern 178 that seeks three events 109 that are generated by a service 106 when a user completes a book. A compute engine 155 may be generated that monitors John Doe's user interactions or, in other words, events 109 generated by a client device 121 belonging to John Doe. However, as the pattern 178 only requires monitoring user interactions with a book reading application (e.g., to identify whether a user has read three books in a week), the compute engine 155 for John Doe does not receive events 109 unrelated to the book reading application. Accordingly, the event listener 148 may only communicate events 109 having a type for which compute engines 155 are interested.

In various embodiments, the compute engines 155 may be implemented as one or more state machines 190a . . . 190n (collectively "state machines 190"). The state machines 190 may comprise, for example, event-driven finite state machines where a transition from one state to another is triggered by an event 109 being passed to a compute engine 155 from the event listener 148. In some embodiments, the state machines 190 may be implemented programmatically using CASE and SWITCH statements available in various programming languages.

The state machines 190 may reach various states or stages while events 109 are matched to patterns 178. In one embodiment, a state of the state machines 190 can include a computation initiation state, a computation state, and a computation publication state. The computation initiation state may include a state where a state machine 190 for a compute engine 155 has been created; however, is not actively matching a pattern 178. The computation state, on the other hand, may include a state where the compute engine 155 is actively matching events 109 to a pattern 178. The computing publication state may include a state where a pattern 178 has been successfully matched and where an action 182 is performed as a result.

In some situations, an administrator may specify a pattern 178 not having a finite duration. For example, an administrator may specify a pattern 178 that monitors John Doe's account to detect ten purchase events 109. A compute engine 155 and a state machine 190 are thus created to match the pattern 178 or, in other words, detect purchase events 109 from a client device 121 for John Doe. However, it is possible that John Doe may never perform ten purchase events 109. As a result, the compute engine 155 and the state machine 190 may consume valuable computational resources although John Doe may never generate a purchase event 109. To improve operation of hardware and software components of an event monitoring system 100, computational resources dedicated to matching patterns 178 should be monitored.

To this end, when a pattern 178 is specified by an administrator client device 175, the event processing application 145 may generate a virtual process, such as a compute engine 155, that matches events 109 to the pattern 178. Additionally, the event processing application 145 may generate a watchdog process 152 that monitors the compute engine 155. The watchdog process 152 may include a virtual process configured to, after expiration of a timer 158, analyze a state of the matching of the pattern 178 performed by the compute engine 155, the state machine 190, as well as other resources assigned to matching patterns 178. For instance, a state of a compute engine 155 or a state machine 190 may be queried to determine whether the compute engine 155 or the state machine 190 are still operational.

Anomalies 160 related to the matching of patterns 178 may be identified by a watchdog process 152. In other words, the watchdog process 152 may be configured to detect anomalies 160 associated with the compute engines 155 or the state machines 190. Anomalies 160 may include, for example, a compute engine 155 or a state machine 190 having terminated prematurely or expired; a compute engine 155 or a state machine 190 not being operational; a compute engine 155 or a state machine 190 generating incorrect results; or other irregularity.

In some embodiments, the watchdog process 152 may be configured to detect anomalies 160 based on the state of the compute engine 155 or the state machine 190. For example, a watchdog process 152 may query a compute engine 155 to identify that a state machine 190 for the compute engine 155 is in a "computation publication" state, indicating that a pattern 178 has been matched using events 109 received from the services 106. The watchdog process 152 may query the event data store 130 to verify that all events 109 in the pattern 178 have actually been matched. If the state of the state machine 190 conflicts with data accessed from the event data store 130, the watchdog process 152 may generate an anomaly 160. The anomaly 160 may include data pertaining to the irregularity identified by the watchdog process 152. Accordingly, the anomaly 160 may be included in a ticket, such as an information technology (IT) repair ticket, and routed to IT personnel.

As may be appreciated, in some situations, an irregularity may occur with the event monitoring system 100 where a substantial number of anomalies 160 are detected by the watchdog processes 152. For instance, if a server or other computing device were to lose power or otherwise fail, a number of compute engines 155 executing on the server might cause the watchdog processes 152 to generate a vast number of anomalies 160. If a repair ticket were generated for each anomaly 160, an IT professional would have to potentially parse through hundreds to thousands of tickets.

Accordingly, in various embodiments, each of the watchdog processes 152 may be configured to "self-heal" by attempting to review and solve detected anomalies 160 on a periodic basis. In one embodiment, when an anomaly 160 is generated by a watchdog process 152, the anomaly 160 is sent to a notification service 195 configured to add the anomaly 160 to a delay queue 142. After a predefined period of time, the notification service 195 may retrieve the anomaly 160 from the delay queue 142 (causing its removal from the delay queue 142) and communicate the anomaly 160 to the originating watchdog process 152. Once the watchdog process 152 receives the anomaly 160 from the delay queue 142, the watchdog process 152 may determine whether the anomaly 160 still exists and, if so, attempt to correct the anomaly 160. If the anomaly 160 no longer exists, the anomaly 160 may be permanently removed from the delay queue 142. Alternatively, if the anomaly 160 persists and cannot be corrected by the watchdog process 152, the anomaly 160 may be added back to the delay queue 142 by the notification service 195 and consulted by the watchdog process 152 at a later time (e.g., after the predefined period of time).

Figure 2A:
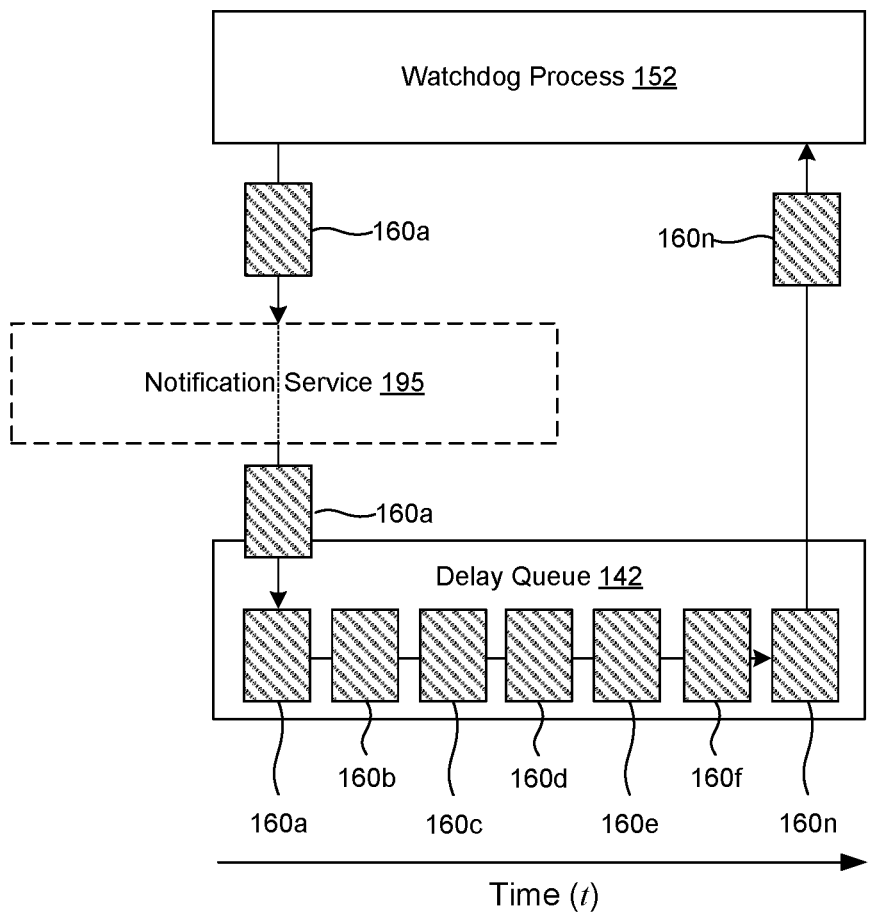
FIGS. 2A-2B are drawings showing embodiments of a watchdog process in communication with a delay queue to perform self-healing operations in the event monitoring system of FIG. 1 according to various embodiments of the present disclosure.
Figure 2B:
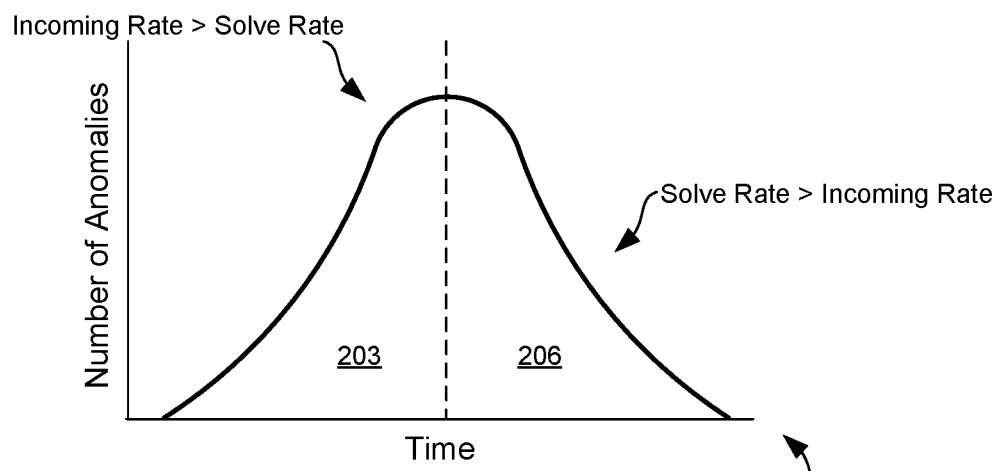

Referring next to FIGS. 2A and 2B, a watchdog process 152 is shown interacting with a notification service 195 and a delay queue 142 to perform self-healing and corrective operations. The watchdog process 152 may generate anomalies 160a . . . 160n when an irregularity is detected pertaining a compute engine 155, a state machine 190, or other resource dedicated to matching a pattern 178. In some embodiments, an anomaly 160a is sent directly to the delay queue 142 along with a specified period of time for storage in the delay queue 142. In other embodiments, an anomaly 160a is sent to a notification service 195, also referred to as publication of an anomaly 160a, where the notification service 195 interacts with the delay queue 142 on behalf of the watchdog process 152. In some embodiments, a service implementing the delay queue 142 may automatically return the anomaly 160a to the watchdog process 152 that originated the anomaly 160a after a lapse of the specified period of time. The anomaly 160n may be returned directly to the watchdog process 152, for example, without having to interact with the notification service 195.

When an anomaly 160n is returned to the watchdog process 152, the watchdog process 152 may determine whether the anomaly 160n still exists. For example, if an anomaly 160a was generated in response to a compute engine 155 ceasing to operate, the same compute engine 155 may be inspected to determine whether the compute engine 155 still is nonoperational. If the anomaly 160n remains active, the watchdog process 152 may attempt to perform a remedial or corrective action, such as restarting the compute engine 155, creating a new compute engine 155 in place of the nonoperational compute engine 155, or other appropriate action. In some embodiments, the delay queue 142 may include a global delay queue 142 that permits storage of anomalies 160 generated by a multitude of watchdog processes 152. In other embodiments, a delay queue 142 may be dedicated to a particular watchdog process 152.

The watchdog processes 152 may function where a number of anomalies 160 generated by the watchdog processes 152 over time resemble a Gaussian curve 200 or a bell curve, as shown in FIG. 2B. For instance, a first portion 203 of the Gaussian curve 200 may trend upwards when an incoming rate of anomalies 160 is greater than a solve rate performed by the watchdog processes 152. Ideally, at least a second portion 206 of the Gaussian curve 200 trends downwards when a solve rate of the anomalies 160 in the delay queue 142 is greater than the incoming rate of anomalies 160. By self-healing, the watchdog processes 152 are capable of resolving anomalies 160 without having to route detected anomalies 160 to IT personnel.

Figures 3A, 3B:
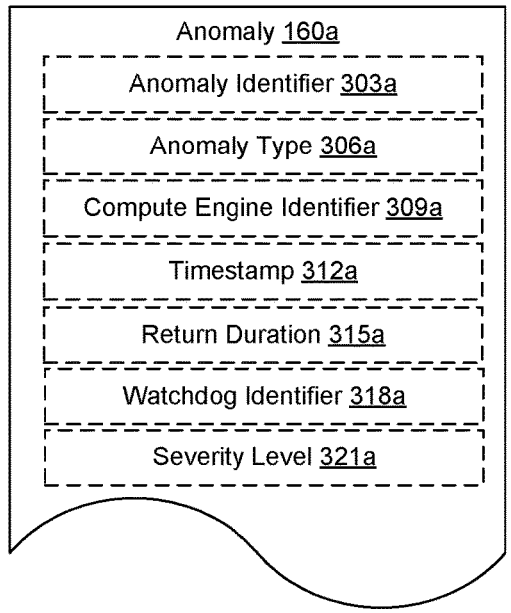
FIGS. 3A-3B are drawings showing embodiments of an anomaly communicated in the event monitoring system of FIG. 1 according to various embodiments of the present disclosure.

Referring next to FIGS. 3A-3B, the structure of an anomaly 160a . . . 160b generated by a watchdog process 152 is shown according to various embodiments. Specifically, FIG. 3A depicts a schematic diagram for an anomaly 160 while FIG. 3B shows an example JavaScript object notation (JSON) data structure that may be communicated over a network using hypertext transfer protocol (HTTP), hypertext transfer protocol secure (HTTPS), or like protocol. While FIG. 3B shows a JSON data structure, other embodiments may include an extensible markup language (XML) data structure or similar data formats.

In various embodiments, an anomaly 160 may generated by a watchdog process 152 to include an anomaly identifier 303a . . . 303b, an anomaly type 306a . . . 306b, a compute engine identifier 309a . . . 309b, a timestamp 312a . . . 312b, a return duration 315a . . . 315b, a watchdog identifier 318a . . . 318b, a severity level 321a . . . 321b, as well as additional information pertaining to irregularity identified by the watchdog process 152 that caused the watchdog process 152 to generate the anomaly 160.

The anomaly identifier 303 may include, for example, a unique identifier that may be used to query the anomaly 160 from the delay queue 142 or retrieve the anomaly from a data store at a later time, if necessary. The anomaly type 306 may include an identifier or label that identifies a type of anomaly 160 that caused the anomaly 160 to be generated. In some embodiments, the anomaly type 306 may include a description capable of identifying a type of anomaly 160, for example, "monitoring entity terminated prematurely," "monitoring entity expired," "monitoring entity not operational," "monitoring entity generating incorrect results," or other irregularity. The compute engine identifier 309 may include an identifier that uniquely identifies a compute engine 155, a state machine 190, or other virtual resource for which the irregularity was identified.

The timestamp 312 may include a time at which the anomaly 160 occurred, was detected by a watchdog process 152, or at which the anomaly 160 was generated by the watchdog process 152. The return duration 315 may include, for example, a duration the anomaly 160 is to be retained in the delay queue 142. For example, the return duration 315 may include a metric measurable in seconds, minutes, hours, days, weeks, months, or other appropriate unit of time. After the anomaly 160 resides in the delay queue 142 for the return duration 315, the anomaly 160 may be returned to the watchdog process 152 that originated the anomaly 160 using, for example, the watchdog identifier 318 that uniquely identifies the watchdog process 152 that originated the anomaly 160.

In further embodiments, the anomaly 160 may include a severity level 321 describing a severity of the irregularity identified. For instance, the severity level 321 may have a value of "HIGH," indicating that a severe irregularity was identified in the event monitoring system 100, or the severity level 321 may be "LOW" indicating that a minor irregularity was identified. In some embodiments, the severity level 321 may be a metric, such as a value from one to ten, where ten is the most severe (or vice versa). In various embodiments, anomalies 160 having a severity level 321 below a certain threshold may be ignored by the watchdog processes 152.

Figure 4:
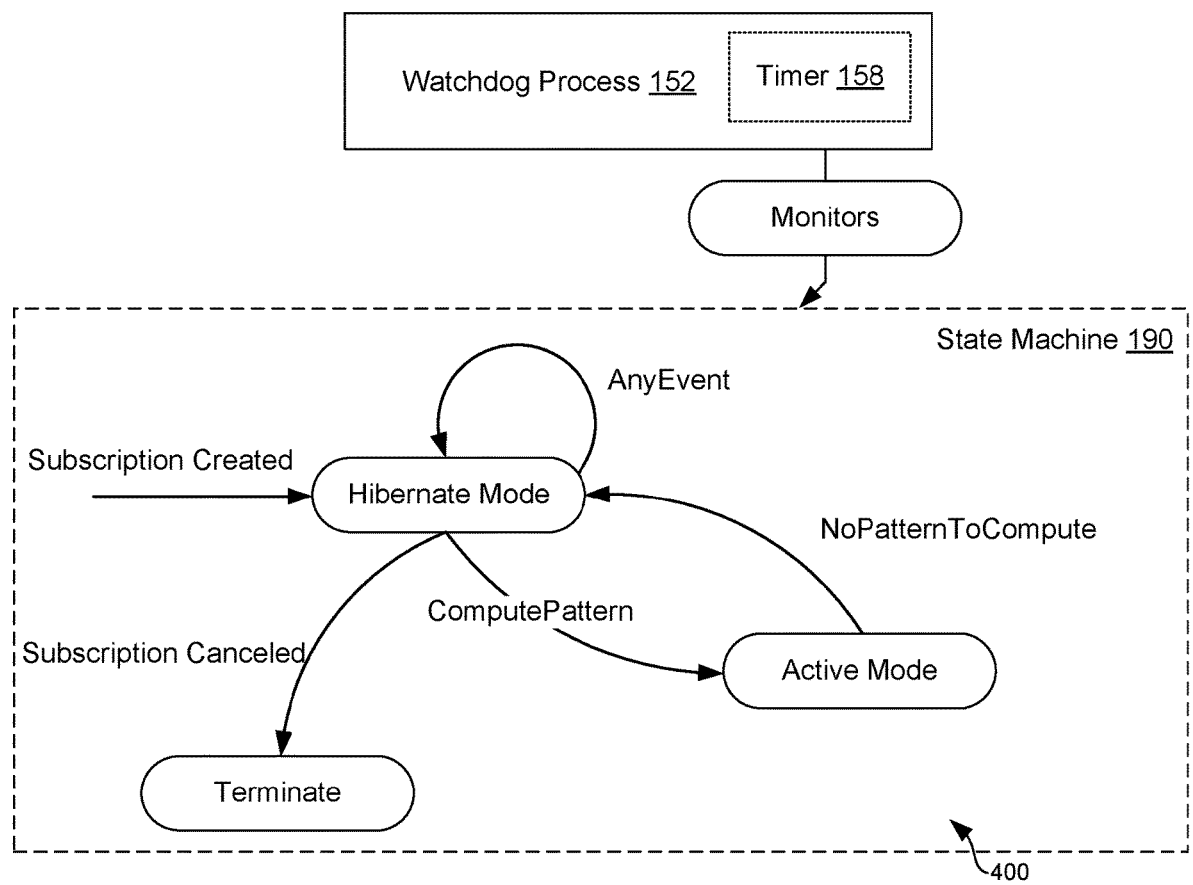
FIG. 4 is a state machine diagram for a state machine monitored by a watchdog process in the event monitoring system of FIG. 1 according to various embodiments of the present disclosure.

Referring next to FIG. 4, shown is a state machine diagram 400 that shows example functionality of a compute engine 155 and a watchdog process 152 executed to monitor the compute engine 155. The compute engine 155 may implement an event-driven finite state machine 190 in the event monitoring system 100. In various embodiments, a compute engine 155 may be generated for a user that attempts to identify one or more patterns 178 in a user lifecycle. For example, a user may create an account with a subscription with an electronic commerce system, purchase various items over an amount of time, and eventually terminate his or her subscription. Administrators may desire to specify patterns 178 for compute engines 155 to match while the user is subscribed to the service. The compute engine 155 generated by the event processing application 145 may monitor a given user's lifecycle following the state machine diagram 400 shown in FIG. 4.

For example, the event processing application 145 may generate a compute engine 155 for a user account when a subscription is created as well as a watchdog process 152 that monitors the compute engine 155 over time. As may be appreciated, the compute engine 155 may monitor events 109 to match events 109 to patterns 178 applicable to the user account. After creation, the compute engine 155 may assume a sleep or hibernate mode where the compute engine 155 does not actively consume computational resources.

Once a pattern 178 applicable to the user is created by an administrator, an active mode is enabled where state machines 190 are spawned by the compute engine 155 to process events 109 received by the compute engine 155 and match patterns 178. After computing one or more events 109 or matching one or more patterns 178, if no patterns 178 require analysis by the compute engine 155, the compute engine 155 may assume the sleep or hibernate mode until another pattern 178 applicable for the user (and the compute engine 155) is created. This may continue until the user cancels his or her subscription. Thereafter, the compute engine 155 may terminate execution to free up memory or other computer resources.

In some embodiments, while a compute engine 155 operates in either the hibernate mode or the active mode, the compute engine 155 may be configured to monitor for additional patterns 178 to process. For example, while in the hibernate mode, the compute engine 155 may query the pattern registry 133 once every three hours, or other predetermined amount of time, to check for new patterns 178. If any new patterns 178 were identified, the state of the compute engine 155 would transition to the active mode, where events 109 from the event listener 148 may be processed. In some embodiments, the compute engine 155 includes a virtual machine or a thread in a parallel computing resource. In further embodiments, the compute engines 155 may be implemented in a master-slave threaded computing environment.

The watchdog process 152 may be configured to detect anomalies 160 based on a state or stage of the state machine 190. For example, a watchdog process 152 may query a compute engine 155 to identify that a state machine 190 for the compute engine 155 is in a "computation publication" state, indicating that a pattern 178 has been matched using events 109 received from the services 106. The watchdog process 152 may query the event data store 130 to verify that all events 109 in the pattern 178 have actually been matched. If the state of the state machine 190 conflicts with data accessed from the event data store 130, the watchdog process 152 may generate an anomaly 160. The anomaly 160 may include data pertaining to the irregularity identified by the watchdog process 152. Accordingly, the anomaly 160 may be included in a ticket, such as an IT repair ticket, and routed to IT personnel.

Figure 5:
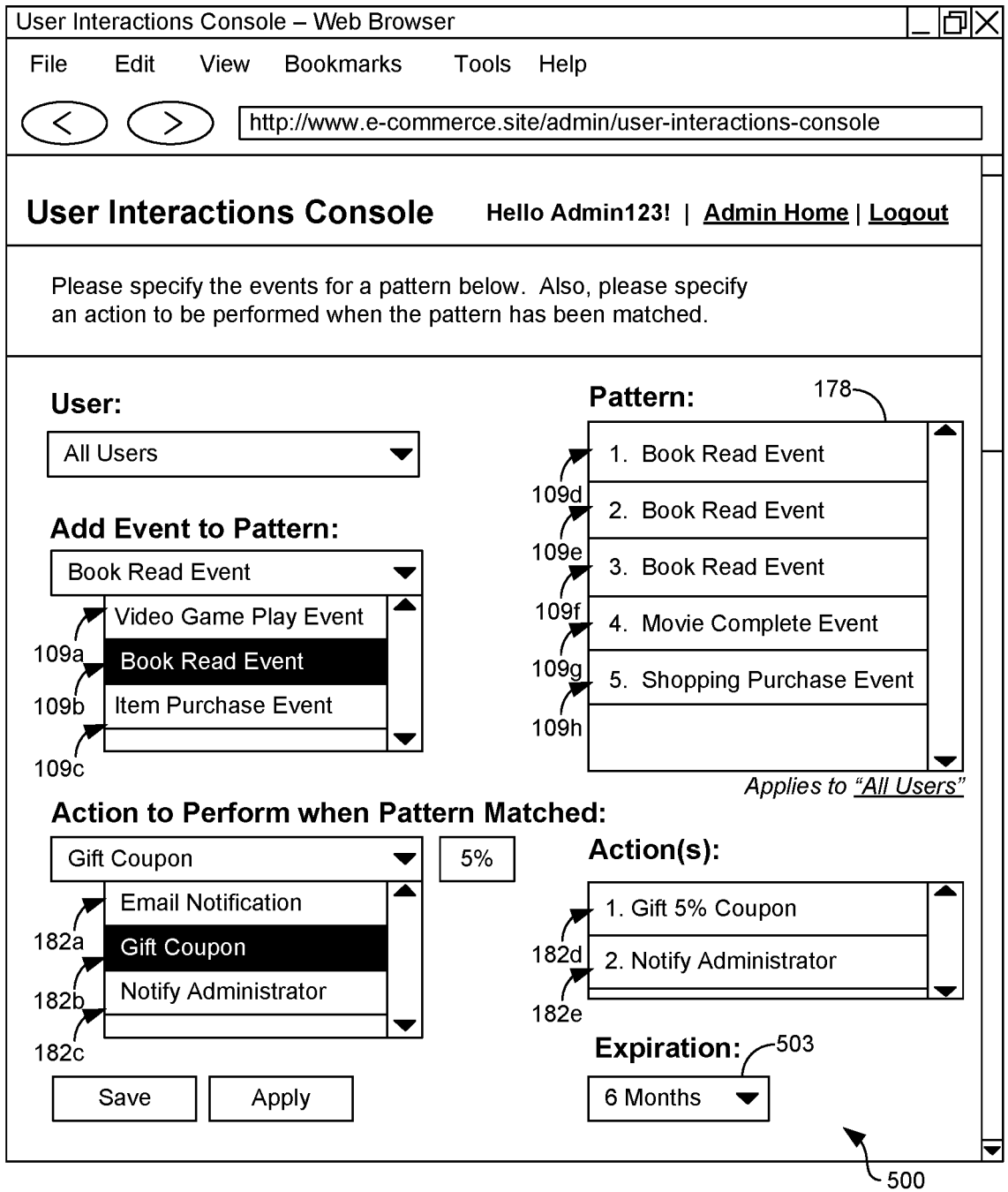
FIG. 5 is an example user interface rendered by an administrator client device in the event monitoring system of FIG. 1 according to various embodiments of the present disclosure.

Turning now to FIG. 5, shown is an example user interface 500 capable of being rendered by an administrator client device 175 to specify a pattern 178 and one or more actions 182a . . . 182e to be performed when a pattern 178 has been matched. For example, the administrator may specify a user or group of users for whom a pattern 178 should be applied. To this end, any compute engines 155 monitoring any of the specified users will be notified of the pattern 178 and may match events 109a . . . 109h to the pattern 178. In the example of FIG. 5, the pattern 178 may include three book read events 109d . . . 109f, a movie complete event 109g, and a shopping purchase event 109h. When the pattern 178 is matched, the 5% gift coupon action 182d and the notify administrator actions 182e may be performed by the event processing application 145, or other appropriate application or service.

In some embodiments, the administrator may specify an expiration time 503 for the pattern 178. In these scenarios, the timer 158 of the watchdog process 152 generated when the pattern 178 is created can be set to the expiration time 503. For instance, if an administrator specifies that a pattern 178 should end or be terminated after six months, the timer 158 of the watchdog process 152 can be set to check on the state of the pattern matching, via a compute engine 155, to verify that the pattern 178 has been completed. If an anomaly 160 is detected where resources are still devoted to matching the pattern 178 that has expired, the watchdog process 152 can perform a necessary remedial action, such as terminating the pattern matching and freeing the devoted resources.

Figure 6:
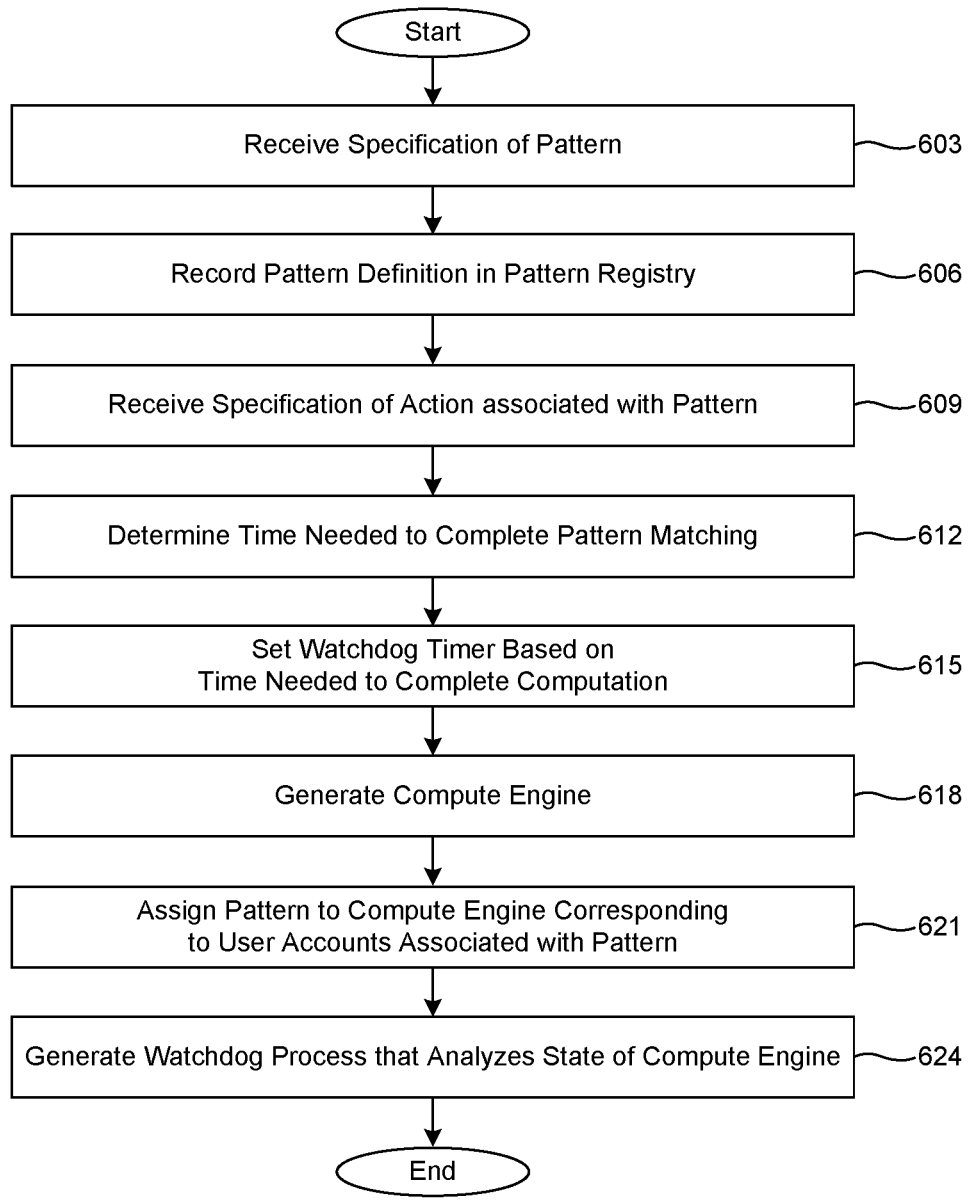
FIG. 6 is a flowchart illustrating functionality implemented by an event processing application executed in a computing environment of the event monitoring system of FIG. 1 according to various embodiments of the present disclosure.

Referring next to FIG. 6, shown is a flowchart that provides one example of the operation of the event processing application 145 according to various embodiments. It is understood that the flowchart of FIG. 6 provides merely an example of the many different types of functional arrangements that may be employed to implement the operation of the event processing application 145 as described herein. As an alternative, the flowchart of FIG. 6 may be viewed as depicting an example of elements of a method implemented in the computing environment 112 according to one or more embodiments.

Beginning with 603, a pattern 178 specified by an administrator is received from, for example, an administrator client device 175. For example, the event processing application 145 may serve up user interface data to generate a user interface 500 similar to the one shown in FIG. 5. By selecting appropriate components in the user interface 500, the administrator may specify a pattern 178 and an action 182 to be performed when the pattern 178 is completed for any applicable users. The pattern 178 specified by the administrator may be received from the administrator client device 175, as may be appreciated.

Next, in 606, the pattern 178 may be recorded in the pattern registry 133 or other suitable data store. As a compute engine 155 may execute for a particular user account, the compute engine 155 may access the pattern registry 133 to identify patterns 178 for the particular user account. In 609, a specification of an action 182 to be performed when the pattern 178 is completed may also be received from the administrator client device 175. The action 182 may be stored in the action registry 136 or other suitable data store for later access.

In 612, the computing environment 112 may determine the time needed to complete a matching of the pattern 178. In some embodiments, the administrator may specify an expiration time 503, as shown in the user interface 500 of FIG. 5. In other embodiments, the administrator may not specify an expiration time 503, or the expiration time 503 may be arbitrary. In this scenario, the time needed to complete the matching of the pattern 178 may be determined based at least in part on the specification of events 109 in the pattern 178.

Next, in 615, a watchdog timer 158 or a watchdog process 152 may be set, for example, based on the time needed for the pattern 178 to be matched, as determined in 612. In other embodiments, the watchdog timer may be set, for example, based on a default period of time. For instance, an administrator of the event monitoring system 100 may desire to have each compute engine 155 executing in the computing environment 112 checked every 30 days. The watchdog timer may thus be set at thirty days, or other appropriate period of time.

In various embodiments, setting the watchdog timer 158 may be optional. For instance, the delay queue 142 may be used for not only storing anomalies 160, but also used to return notifications to the watchdog process 152 that causes the watchdog process 152 to check a state of the matching of the pattern 178. In other words, events 109 are stored in the delay queue 152 that, after an elapse of a predetermined period of time, cause the watchdog process 152 to check the state of the matching of the pattern 178, as opposed to relying on a watchdog timer 158.

Next, in 618, a compute engine 155 may be generated to match events 109 received from the services 106 to the pattern 178. Generating a compute engine 155 may include, for example, creating a configuration file and communicating the configuration file to an application that generate a virtual instance of a compute engine 155 in accordance with the configuration file. In some scenarios, a compute engine 155 may already exist for a particular pattern 178 or user account. In these situations, the compute engine 155 may not need be generated and 618 may be skipped or omitted. In 621, the pattern 178 may be assigned to the compute engines 155 corresponding to the user accounts associated with the pattern 178, such as those identified in 615.

Finally, in 624, a watchdog process 152 may be generated to monitor and periodically analyze a state of the compute engine 155 or other virtual processes that are dedicated to the matching of the pattern 178. In one embodiment, the watchdog process 152 is not executed until the time determined in 612 has elapsed. In another embodiment, the watchdog process 152 may be generated and placed in a sleep mode until the time determined in 612 has elapsed. The watchdog process 152 may identify whether the compute engine 155 or other virtual resources are and remain operational during the life of pattern 178. Thereafter, the process may proceed to completion.

Figure 7:
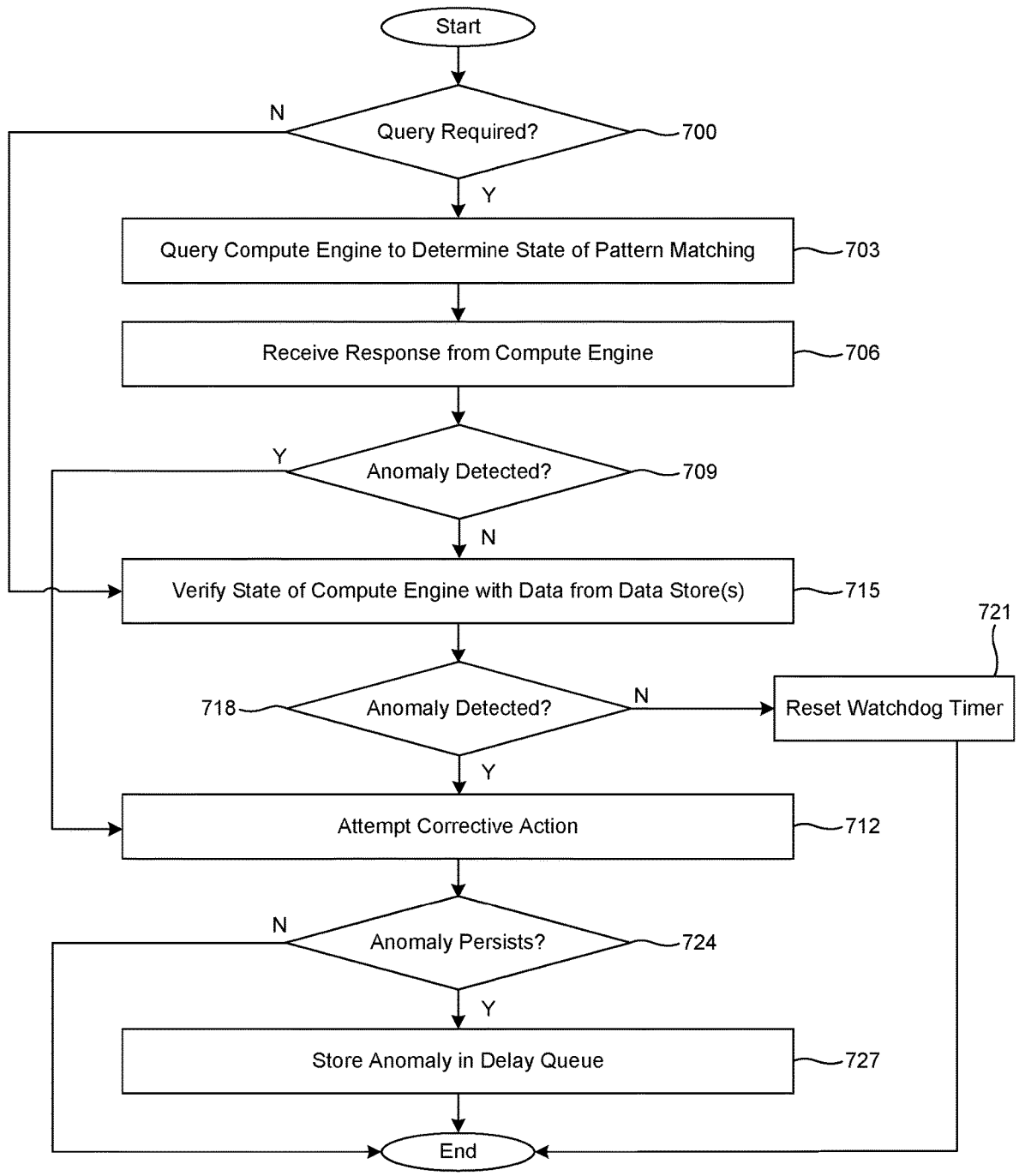
FIGS. 7, 8A, and 8B are flowcharts illustrating functionality implemented by a watchdog process executed in the computing environment in the event monitoring system of FIG. 1 according to various embodiments of the present disclosure.

Referring next to FIG. 7, shown is a flowchart that provides one example of the operation of a watchdog process 152 according to various embodiments. It is understood that the flowchart of FIG. 7 provides merely an example of the many different types of functional arrangements that may be employed to implement the operation of the watchdog process 152 as described herein. As an alternative, the flowchart of FIG. 7 may be viewed as depicting an example of elements of a method implemented in the computing environment 112 according to one or more embodiments.

In some embodiments, a watchdog process 152 may be generated in response to creation of a pattern 178 by an administrator client device 175 where the watchdog process 152 is configured to monitor resources dedicated to matching the pattern 178 based on events 109 received from the services 106. In another embodiment, a watchdog timer 158 is set using a period of time that, when the period of time has elapsed, causes a watchdog process 152 to be created to determine whether any anomalies 160 exist with the matching of the pattern 178.

Beginning with 700, the watchdog process 152 may determine whether a query is required to check on a state of the event monitoring system 100 or a specific instance of a pattern 178 being matched by virtual resources. For instance, in some situations, a compute engine 155 may have completed matching a pattern 178 and no longer exists in the event monitoring system 100 and, thus, cannot be queried. In other situations, the compute engine 155 may exist in the event monitoring system 100 and, thus, may be able to respond to queries from the watchdog process 152. If a query is not required, the process may proceed to 715, as will be discussed.

Alternatively, if a query is required (or may be beneficial in checking performance of the event monitoring system 100), the process may proceed to 703 to query a compute engine 155 or other virtual resource dedicated to matching a pattern 178 to determine a state of the matching of the pattern 178. For instance, a compute engine 155, or a state machine 190 implemented by the compute engine 155, may reach various states or stages while events 109 are received and matched to patterns 178. For example, a state can include a computation initiation state, a computation state, and a computation publication state. The computation initiation state may include a state where a state machine 190 for a compute engine 155 has been created, but not actively matching a pattern 178. The computation state may include a state where the compute engine 155 is actively matching events 109 to a pattern 178. The computing publication state may include a state where a pattern 178 has been successfully matched and where an action 182 is performed as a result.

In 706, the watchdog process 152 may receive a response from the compute engine 155 indicating a state of the matching of the pattern 178. Thereafter, in 709, the watchdog process 152 may determine whether any anomalies 160, or irregularities, have been detected in the matching of the pattern 178. In one example, if a response is not received from the compute engine 155, it may indicate that the compute engine 155 has been deleted or is no longer operational. In another example, the response may indicate that the pattern 178 is still being performed; however, the compute engine 155 may not have matched an event 109 to the pattern 178 over a threshold period of time, such as two years or other appropriate time.

If an anomaly 160 is detected by the watchdog process 152, the process may proceed to 712 where the watchdog process 152 may attempt to take a corrective action, as will be discussed. However, referring back to 709, if the watchdog process 152 does not detect an anomaly 160, the process may proceed to 715. In 715, the watchdog process 152 may verify a state of the compute engine 155, as indicated in the response to the query, with data stored in one of the data stores. For example, if a state of the compute engine 155 is in a "computation publication" state, it may indicate that a pattern 178 has been matched using events 109 received from the services 106. The watchdog process 152 may query the event data store 130 to verify that all events 109 in the pattern 178 have actually been matched.

Hence, in 718, the compute engine 155 may again determine whether an anomaly 160 is detected. For example, if the state of the state machine 190 conflicts with data accessed from the event data store 130, the watchdog process 152 may detect an anomaly 160. If no anomaly 160 is detected in 718, the process may proceed to 721 where the timer 158 of the watchdog process 152 is reset. Thereafter, the process may proceed to completion.

Referring back to 718, if an anomaly 160 is detected in 718, the process may proceed to 712 where the watchdog process 152 attempts to perform a corrective or remedial action that may cure the anomaly 160. For example, the watchdog process 152 may change a state of the compute engine 155 to reflect the accurate state in the matching of the pattern 178. In another example, if a compute engine 155 is non-operational, the watchdog process 152 may free up any resources dedicated to matching that pattern 178 and create new resources, such as a new compute engine 155, that may match the pattern 178 in place of the nonoperational compute engine 155.

In 724, the watchdog process 152, after attempting corrective action, may determine whether the anomaly 160 still persists. For instance, it may be determined whether the corrective action has fixed the anomaly 160. If the anomaly 160 has been alleviated, the process may proceed to completion. Alternatively, the anomaly 160 still persists, the process may proceed to 727 where the anomaly 160 (or information associated therewith) may be stored in a delay queue 142, discussion of which will follow in FIGS. 8A and 8B. Thereafter, the process may proceed to completion.

Figure 8A:
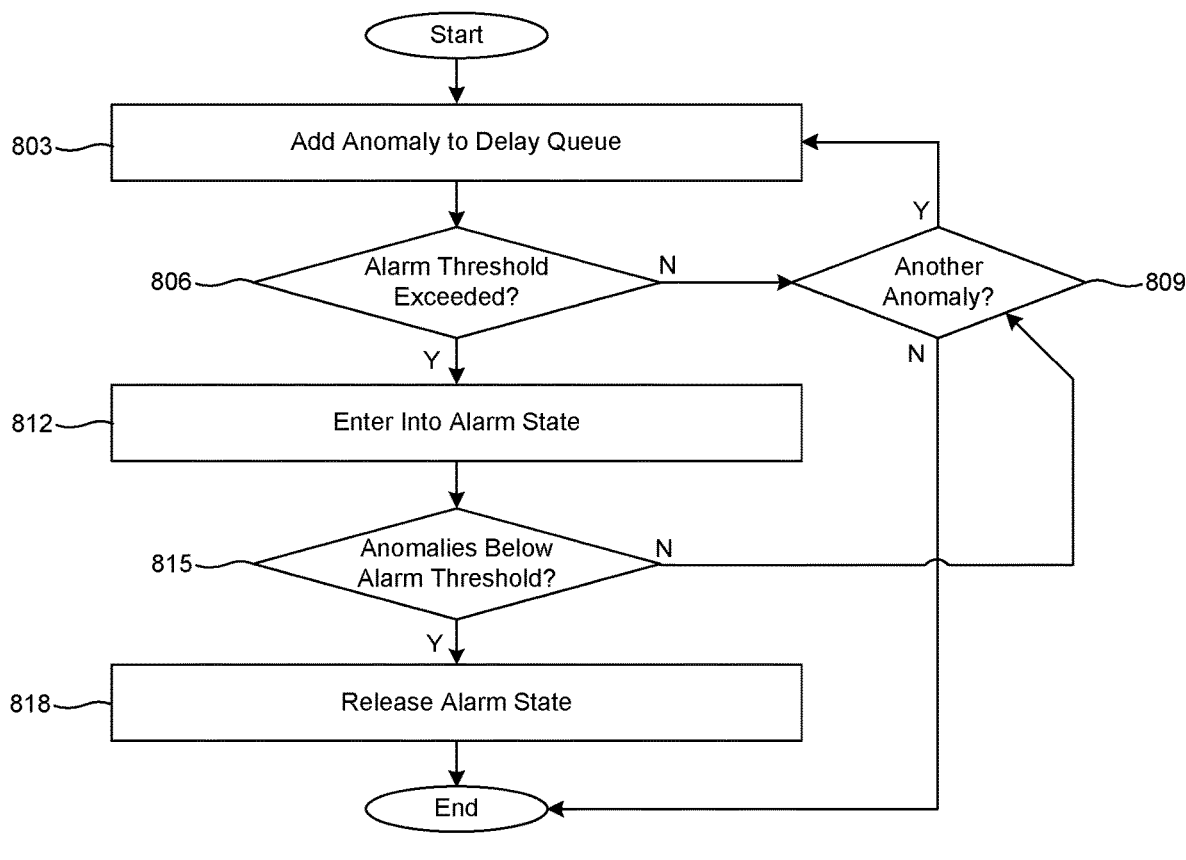

Moving on to FIG. 8A, shown is a flowchart that provides another example of the operation of a watchdog process 152 according to various embodiments. It is understood that the flowchart of FIG. 8A provides merely an example of the many different types of functional arrangements that may be employed to implement the operation of the watchdog process 152 as described herein. As an alternative, the flowchart of FIG. 8A may be viewed as depicting an example of elements of a method implemented in the computing environment 112 according to one or more embodiments.

In various embodiments, a watchdog process 152 may interact with a delay queue 142 to perform self-heal or corrective operations. Starting with 803, if a watchdog process 152 detects an anomaly 160 and a corrective action is not successful in alleviating the anomaly 160, the watchdog process 152 can add the anomaly 160 to a delay queue 142. In some embodiments, an anomaly 160 is added to the delay queue 142 by a notification service 195 along with a specified period of time for storage in the delay queue 142. For example, a service implementing the delay queue 142 may automatically return the anomaly 160 to the watchdog process 152 that originated the anomaly 160a after a lapse of the specified period of time.

Next, in 806, the watchdog process 152 may determine whether an alarm threshold has been met or, in other words, whether a number of anomalies 160 in the delay queue 142 has exceeded an alarm threshold. For instance, in 809, if more than a hundred anomalies 160 are detected in the delay queue 142, or other threshold amount, the watchdog process 152 may proceed to 812 to enter into an alarm state. In an alarm state, a ticket may be generated and routed to an administrator of the event monitoring system 100 with a high urgency. The system may stay in a state of alarm until the number of anomalies 160 in the delay queue 142 has fallen below the alarm threshold, as may be appreciated.

If a number of anomalies 160 in the delay queue 142 does not exceed the alarm threshold, the process may proceed to 809. In 809, the watchdog process 152 may determine whether another anomaly 160 has been identified and, if so, the process may revert to 803 to add the newly identified anomaly 160 to the delay queue. Referring back to 809, if another anomaly 160 is not identified the process may proceed to completion.

Referring back to 812, if the event monitoring system 100 has entered into an alarm state, the process may proceed to 815. In 815, the watchdog process 152 may determine whether a number of anomalies 160 has fallen below the alarm threshold. For instance, as the watchdog process 152 attempts corrective actions when anomalies 160 are returned to the watchdog process 152, the number of the anomalies 160 may reduce, as shown in the second portion 206 of the Gaussian curve 200 shown in FIG. 2B.

If the number of anomalies 160 in the delay queue 142 has not fallen below the alarm threshold, the process may revert to 809. Alternatively, if the number of anomalies 160 in the delay queue 142 has fallen below the alarm threshold, the process may proceed to 818 whether the alarm state is released where the event monitoring system 100 no longer operates in the alarm state. For example, any alarms generated and notified to IT personnel may be canceled. Additionally, IT personnel may be notified that the event monitoring system 100 is no longer in an alarm state.

Figure 8B:
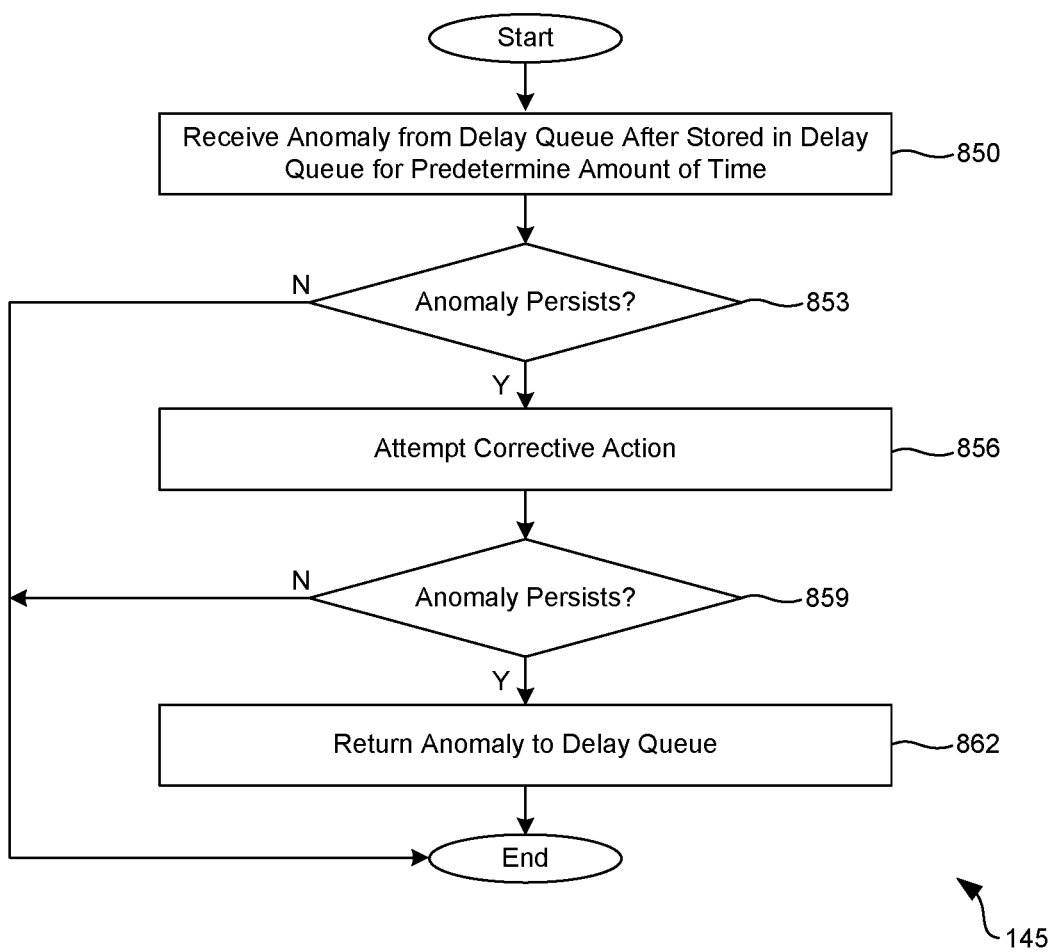

Moving on to FIG. 8B, shown is a flowchart that provides another example of the operation of a watchdog process 152 according to various embodiments. It is understood that the flowchart of FIG. 8B provides merely an example of the many different types of functional arrangements that may be employed to implement the operation of the watchdog process 152 as described herein. As an alternative, the flowchart of FIG. 8B may be viewed as depicting an example of elements of a method implemented in the computing environment 112 according to one or more embodiments.

As discussed above, to implement a delay queue 142 where the watchdog process 152 attempts self-heal operations, an anomaly 160 is stored in the delay queue 142 for a predefined amount of time. After the predefined amount of time has elapsed, in 850, the anomaly 160 is received by the watchdog process 152 that initially detected and stored the anomaly 160 in the delay queue 142. Next, in 853, the watchdog process 152 may determine whether the anomaly 160 persists. If the watchdog process 152 determines that the anomaly 160 has been alleviated or otherwise no longer exists in the event monitoring system 100, the process may proceed to completion. As may be appreciated, the anomaly 160 no longer exists in the delay queue 142.

Alternatively, if the watchdog process 152 determines that the anomaly 160 persists, the process may proceed to 856. In 856, the watchdog process 152 may attempt to perform a corrective action. For example, the watchdog process 152 may change a state of the compute engine 155 to reflect the accurate state in the matching of the pattern 178. In another example, if a compute engine 155 is non-operational, the watchdog process 152 may free up any resources dedicated to matching that pattern 178 and create new resources, such as a new compute engine 155, that may match the pattern 178 in place of the nonoperational compute engine 155.

After attempting a corrective action, in 859, the watchdog process 152 may again determine whether the anomaly 160 still persists. In other words, the watchdog process 152 may determine whether the corrective action has fixed the anomaly 160. If the anomaly 160 has been alleviated and no longer persists, the process may proceed to completion and, as the anomaly 160 has been removed from the delay queue 142, the anomaly 160 no longer exists in the event monitoring system 100. Alternatively, the anomaly 160 still persists, the process may proceed to 862 where the anomaly 160 is returned to the delay queue 142.

The watchdog processes 152 may function where a number of anomalies 160 generated by the watchdog processes 152 over time resemble a Gaussian curve 200 or a bell curve, as shown in FIG. 2B. For instance, a first portion 203 of the Gaussian curve 200 may trend upwards when an incoming rate of anomalies 160 is greater than a solve rate performed by the watchdog processes 152. The upwards trend may be exponential due to computations having dependence on other computations, as may be appreciated. Ideally, at least a second portion 206 of the Gaussian curve 200 trends downwards when a solve rate of the anomalies 160 in the delay queue 142 is greater than the incoming rate of anomalies 160. By self-healing, the watchdog processes 152 are capable of resolving anomalies 160 without having to route detected anomalies 160 to system administrators. Thereafter, the process may proceed to completion.

Figure 9:
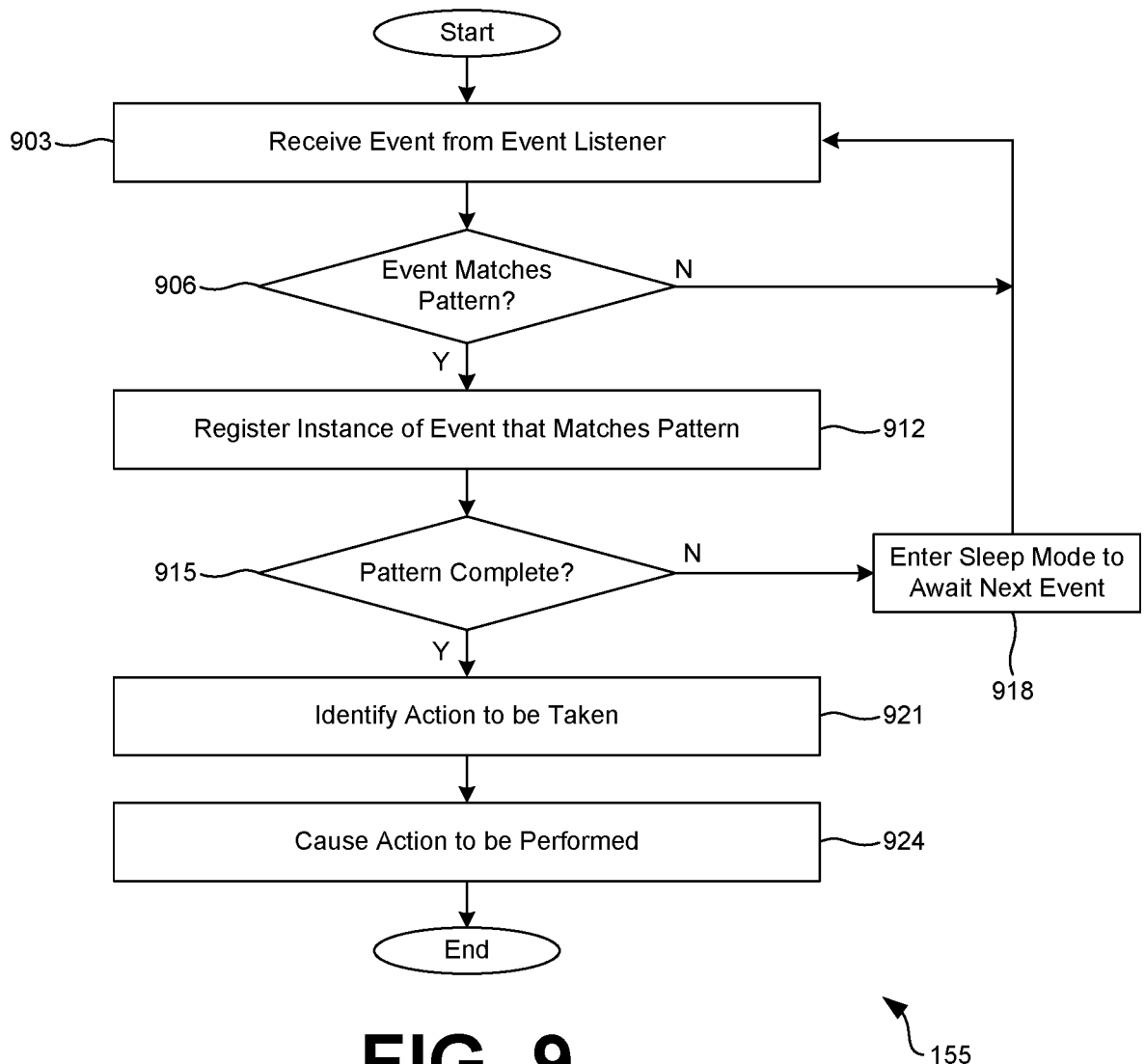
FIG. 9 is a flowchart illustrating functionality implemented by a compute engine executed in the computing environment of the event monitoring system of FIG. 1 according to various embodiments of the present disclosure.

Turning now to FIG. 9, shown is a flowchart that provides one example of the operation of the compute engine 155 according to various embodiments. It is understood that the flowchart of FIG. 9 provides merely an example of the many different types of functional arrangements that may be employed to implement the operation of the compute engine 155 as described herein. As an alternative, the flowchart of FIG. 9 may be viewed as depicting an example of elements of a method implemented in the computing environment 112 according to one or more embodiments.

Beginning with 903, a compute engine 155 may receive an event 109 from the event listener 148. Next, in 906, the compute engine 155 may determine whether the event 109 matches a pattern 178. As the compute engine 155 may execute for a given user or user account, the compute engine 155 may identify all patterns 178 associated with the user and may determine whether the event 109 matches an event 109 in the one or more patterns 178. If the event 109 received does not match events 109 in the pattern 178, or no pattern 178 exists, the event 109 may be discarded. In alternative embodiments, the process may proceed to 918 to enter into a sleep mode to await a next event 109, as will be discussed.

Referring back to 906, if, however, the event 109 matches a pattern 178, the process may proceed to 912 where the instance of the event 109 matching an event 109 in the pattern 178 is registered in an appropriate data store. In some embodiments, instances of an event 109 matching a pattern 178 are stored in the compute engine index 137 or, in other embodiments, the instances of an event 109 matching a pattern 178 are archived, logged, or otherwise stored in a data store (e.g., an off-line data store) for analytical analysis of the matching instances at a later time.

Next, in 915, the compute engine 155 determines whether the pattern 178 has been complete. In other words, the compute engine 155 determines whether all events 109 included in a pattern 178 have been matched. If the pattern 178 is not complete, the process may proceed to 918 where the compute engine 155 enters into a sleep or hibernation mode to await receipt of the next event 109. Thereafter, the process may revert to 903.

Referring back to 915, if the pattern 178 is complete, the process may proceed to 921 where an action 182 associated with the pattern 178 is identified. This may include, for example, querying the action registry 136 to identify an action 182 corresponding to the pattern 178 having been completed. Next, in 924, the action 182 is performed. In some embodiments, the compute engine 155 may perform the action 182. In other embodiments, the event processing application 145 may perform the action 182 or may communicate the action 182 to an external application 185 for performance. In further embodiments, when a pattern 178 has been completely matched with events 109, the pattern 178 and associated events 109 and actions 182 may be stored in an off-line data store for archival purposes as well as to free memory in the event data store 130, pattern registry 133, action registry 136, or other data store. Thereafter, the process may proceed to completion.

Figure 10:
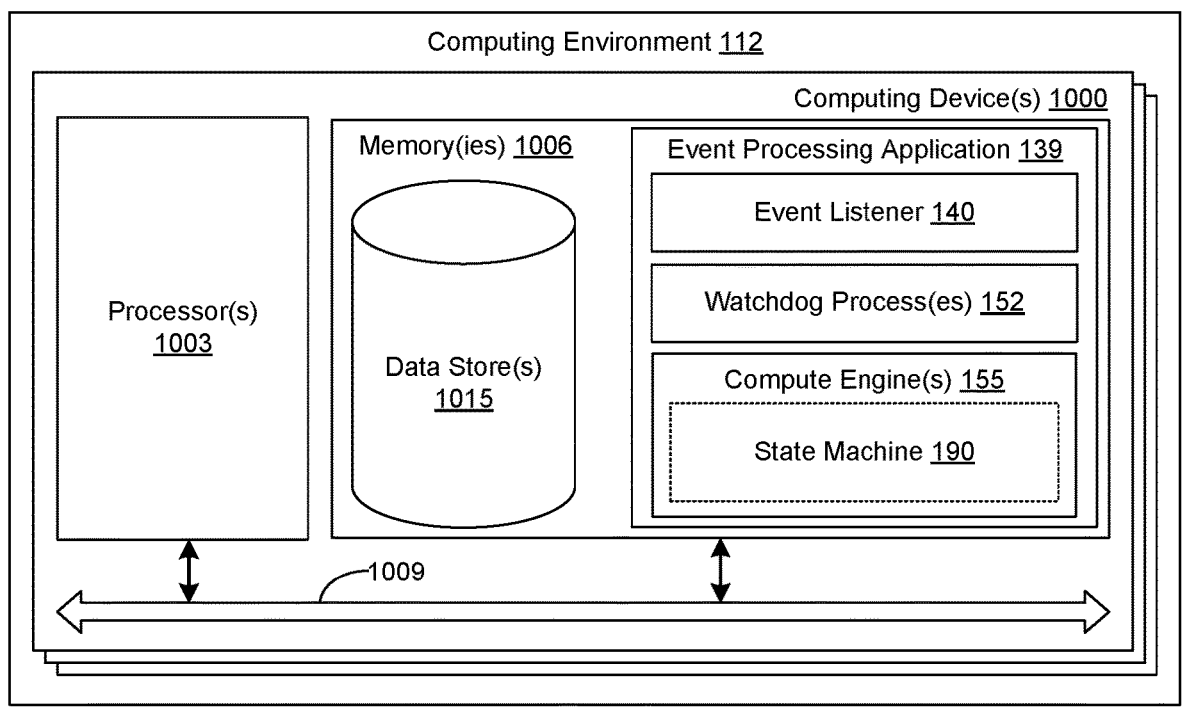
FIG. 10 is a schematic block diagram illustrating of a computing environment employed in the event monitoring system of FIG. 1 according to various embodiments of the present disclosure.

With reference to FIG. 10, shown is a schematic block diagram of the computing environment 112 according to an embodiment of the present disclosure. The computing environment 112 includes one or more computing devices 1000. Each computing device 1000 includes at least one processor circuit, for example, having a processor 1003 and a memory 1006, both of which are coupled to a local interface 1009. To this end, each computing device 1000 may comprise, for example, at least one server computer or like device. The local interface 1009 may comprise, for example, a data bus with an accompanying address/control bus or other bus structure as may be appreciated.

Stored in the memory 1006 are both data and several components that are executable by the processor 1003. In particular, stored in the memory 1006 and executable by the processor 1003 are the event processing application 145, the event listener 148, the watchdog process(es) 152, the compute engines 155, the state machine 190, and potentially other applications. Also stored in the memory 1006 may be a data store 1015 and other data. The data store 1015 may include, for example, the event data store 130, the pattern registry 133, the action registry 136, and the compute engine index 137. In addition, an operating system may be stored in the memory 1006 and executable by the processor 1003.

It is understood that there may be other applications that are stored in the memory 1006 and are executable by the processor 1003 as may be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1006 and are executable by the processor 1003. In this respect, the term "executable" means a program file that is in a form that may ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 903 and/or multiple processor cores and the memory 1006 may represent multiple memories 906 that operate in parallel processing circuits, respectively. In such a case, the local interface 1009 may be an appropriate network that facilitates communication between any two of the multiple processors 903, between any processor 1003 and any of the memories 906, or between any two of the memories 906, etc. The local interface 1009 may comprise additional systems designed to coordinate this communication, including, for example, performing load balancing. The processor 1003 may be of electrical or of some other available construction.

Although the event processing application 145, the event listener 148, the watchdog processes 152, the compute engine(s) 155, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6, 7, 8A, 8B, and 9 show the functionality and operation of an implementation of portions of the event processing application 145, the event listener 148, the watchdog processes 152, and the compute engine(s) 155. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 6, 7, 8A, 8B, and 9 show a specific order of execution, it is understood that the order of execution may differ from that which is depicted. For example, the order of execution of two or more blocks may be scrambled relative to the order shown. Also, two or more blocks shown in succession in FIGS. 6, 7, 8A, 8B, and 9 may be executed concurrently or with partial concurrence. Further, in some embodiments, one or more of the blocks shown in FIGS. 6, 7, 8A, 8B, and 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the event processing application 145, the watchdog process(es) 152, the compute engine(s) 155, and the state machines 190, that comprise software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the event processing application 145, the watchdog process(es) 152, the compute engines 155, and the state machines 190, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1000, or in multiple computing devices in the same computing environment 112.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device; and
    program instructions executable in the at least one computing device that, when executed, cause the at least one computing device to:
        receive a pattern of events describing user interaction with at least one client application executable on a client device, the pattern of events specifying a plurality of potential events capable of being performed on the client device in association with the at least one client application;
        generate a virtual process configured to match the pattern of events against a plurality of events received from at least one computing resource;
        generate a watchdog process configured to, after a first predetermined period of time, analyze a state of the virtual process relative to matching the pattern of events; and
        in response to an anomaly being detected based at least in part on the state of the virtual process, add the anomaly to a delay queue, wherein the watchdog process is further configured to:
            after a second predetermined period of time, access the anomaly from the delay queue to determine that the anomaly no longer exists; and
            in response to the anomaly no longer existing, remove the anomaly from the delay queue.

2. The system of claim 1, further comprising program instructions executable in the at least one computing device that, when executed, cause the at least one computing device to attempt to perform a corrective action prior to placing the anomaly in the delay queue.

3. The system of claim 1, wherein the pattern of events and an action to be performed in response to the pattern of events being matched using the plurality of events are received from an administrator client device.

4. A system, comprising:
    at least one computing device; and
    program instructions executable in the at least one computing device for implementing an event monitoring system that, when executed by the at least one computing device, cause the at least one computing device to:
        receive a pattern of events describing user interaction with at least one client application executable on a client device from at least one service, the pattern of events specifying a plurality of potential events capable of being performed on the client device in association with the at least one client application;
        generate a virtual process configured to match the pattern of events against a plurality of events received from at least one computing resource;
        record at least one event type with a registry maintained in a data store in association with the virtual process that causes at least a subset of the plurality of events matching the at least one event type to be routed automatically to the virtual process;
        generate a watchdog process configured to, after a first predetermined period of time, analyze a state of the virtual process relative to matching the pattern of events;
        add an anomaly to a delay queue in response to the anomaly being detected based at least in part on the state of the virtual process;
        determine that a number of anomalies stored in the delay queue exceeds an alarm threshold; and
        in response to the number of anomalies stored in the delay queue exceeding the alarm threshold, cause the event monitoring system to enter into an alarm state.

5. The system of claim 4, wherein the watchdog process is further configured to:
    after a second predetermined period of time, access the anomaly from the delay queue to determine that the anomaly no longer exists; and
    in response to the anomaly no longer existing, remove the anomaly from the delay queue.

6. The system of claim 4, wherein the watchdog process is further configured to:
    after a second predetermined period of time, access the anomaly from the delay queue to attempt to perform a corrective action to alleviate the anomaly; and
    in response to the anomaly persisting after the corrective action, return the anomaly to the delay queue.

7. The system of claim 4, further comprising program instructions executable in the at least one computing device that, when executed, cause the at least one computing device to:
    determine that the number of anomalies stored in the delay queue has fallen below the alarm threshold; and in response to the number of anomalies stored in the delay queue having fallen below the alarm threshold, cause the event monitoring system to no longer operate in the alarm state.

8. The system of claim 4, wherein the watchdog process is an independent virtual process from the virtual process and is one of: a virtual machine executed in the at least one computing device or a thread processed in the at least one computing device.

9. The system of claim 8, wherein the virtual process does not include logic configured to interact specifically with the watchdog process.

10. The system of claim 4, wherein:
the watchdog process is one of a plurality of watchdog processes; and
the anomaly is one of a plurality of anomalies identified by the plurality of watchdog processes; and
the delay queue is a global delay queue that stores the plurality of anomalies for the plurality of watchdog processes.

11. The system of claim 4, wherein the at least one service comprises a plurality of services, individual ones of the plurality of services having an event reporting agent configured to generate the plurality of events and store the plurality of events in an event data store accessible by the at least one computing device.

12. The system of claim 4, further comprising program instructions executable in the at least one computing device that, when executed, cause the at least one computing device to:
receive an expiration time in association with the pattern of events; and
set a watchdog timer using the expiration time, wherein the watchdog process is configured to, after an expiration of the watchdog timer, cause the watchdog process to identify the anomaly.

13. The system of claim 4, wherein entering into the alarm state comprises directing the at least one computing device to generate a ticket and route the ticket to an administrator of the event monitoring system, the ticket being associated with a high urgency.

14. A method, comprising:
generating, by at least one computing device comprising at least one hardware processor, at least one user interface configured to receive a specification of a pattern of events to monitor at least one instance of user interaction with a client device in association with a client application or a network site;
receiving, by the at least one computing device, a plurality of events from at least one service over a network;
generating, by the at least one computing device, a virtual process configured to match the pattern of events against a plurality of events received from at least one computing resource;
setting, by the at least one computing device, a watchdog timer configured to, after a first predetermined period of time, cause a watchdog process to identify at least one anomaly associated with the virtual process matching the pattern of events; and
in response to the at least one anomaly being identified, performing, by the at least one computing device, at least one corrective action in an attempt to alleviate the at least one anomaly;
adding, by the at least one computing device, the at least one anomaly to a delay queue in response to the at least one corrective action not alleviating the at least one anomaly;
determining, by the at least one computing device, that a number of anomalies stored in the delay queue exceeds an alarm threshold; and
in response to the number of anomalies stored in the delay queue exceeding the alarm threshold, entering, by the at least one computing device, into an alarm state.

15. The method of claim 14, further comprising:
after a second predetermined period of time, accessing, by the watchdog process, the at least one anomaly from the delay queue to determine that the at least one anomaly no longer exists; and
in response to the at least one anomaly no longer existing, removing, by the watchdog process, the at least one anomaly from the delay queue.

16. The method of claim 14, further comprising:
after a second predetermined period of time, accessing, by the watchdog process, the at least one anomaly from the delay queue and attempting to perform another action to alleviate the at least one anomaly; and
in response to the at least one anomaly persisting, returning, by the watchdog process, the at least one anomaly to the delay queue.

17. The method of claim 14, wherein the virtual process is at least one of: a compute engine and an event-driven finite state machine.

18. The method of claim 14, wherein setting, by the at least one computing device, the watchdog timer further comprises:
receiving, by the at least one computing device, an expiration time in association with the pattern of events; and
setting, by the at least one computing device, the watchdog timer using the expiration time.

19. The method of claim 14, further comprising:
determining, by the at least one computing device, that the number of anomalies stored in the delay queue has fallen below the alarm threshold; and
in response to the number of anomalies stored in the delay queue having fallen below the alarm threshold, operating, by the at least one computing device, no longer in the alarm state.

20. The method of claim 14, wherein entering into the alarm state comprises generating, by the at least one computing device, a ticket and routing, by the at least one computing device, the ticket to an administrator, the ticket being associated with a high urgency.

* * * * *